United States Patent [19]

Fisher

[11] 4,069,987
[45] Jan. 24, 1978

[54] INERTIA LOCKING SEAT BELT RETRACTOR

[76] Inventor: Robert C. Fisher, 580 E. Long Lake Road, Bloomfield Hills, Mich. 48013

[21] Appl. No.: 744,640

[22] Filed: Nov. 24, 1976

Related U.S. Application Data

[62] Division of Ser. No. 385,315, Aug. 3, 1975, Pat. No. 4,014,480.

[51] Int. Cl.$^2$ .................. A62B 35/02; B65H 75/48
[52] U.S. Cl. ...................... 242/107.4 A; 74/577 M
[58] Field of Search .................. 242/107.4 R–107.4 E; 297/388; 280/744–747; 74/575, 577, 578

[56] References Cited

U.S. PATENT DOCUMENTS 3,421,605 1/1969 Hansen .................. 242/107.4 A X
3,985,314 10/1976 Booth .................. 242/107.4 A

*Primary Examiner*—Harvey C. Hornsby
*Assistant Examiner*—John M. Jillions

[57] ABSTRACT

The disclosure relates to a safety belt retractor and more particularly to a mechanism for locking the spool of a seat belt retractor against rotation. A single pawl is provided with a pair of spaced teeth that sequentially engage complementary teeth on a pair of spool ratchets, respectively, thereby minimizing "bounce" of the pawl relative to the ratchets.

3 Claims, 5 Drawing Figures

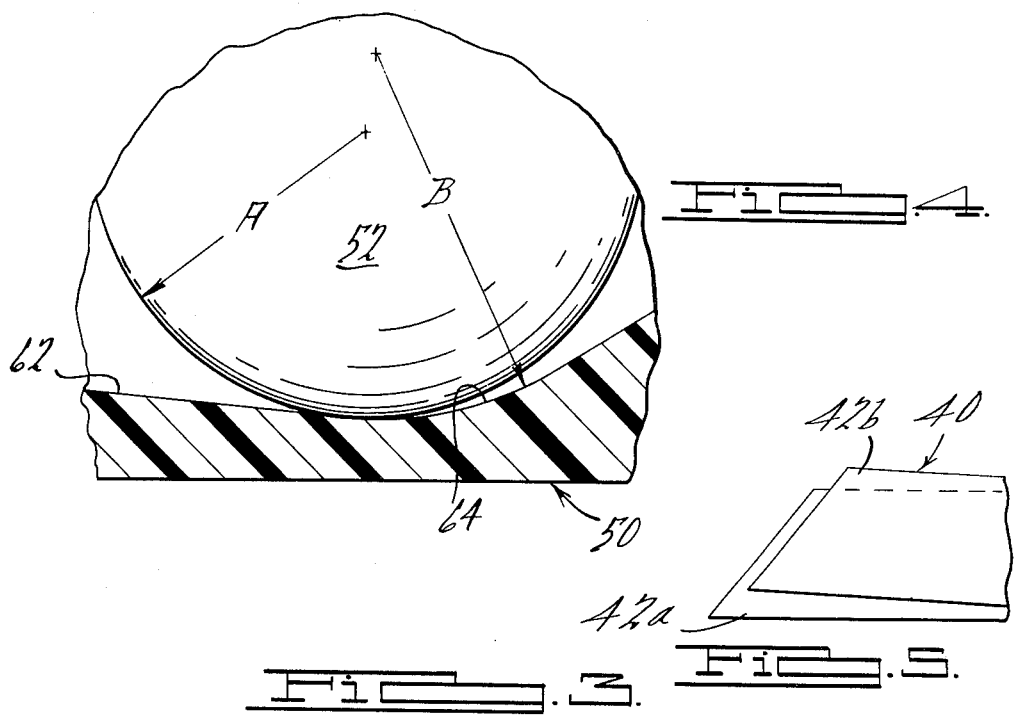
FIG. 4.
FIG. 3.
FIG. 5.
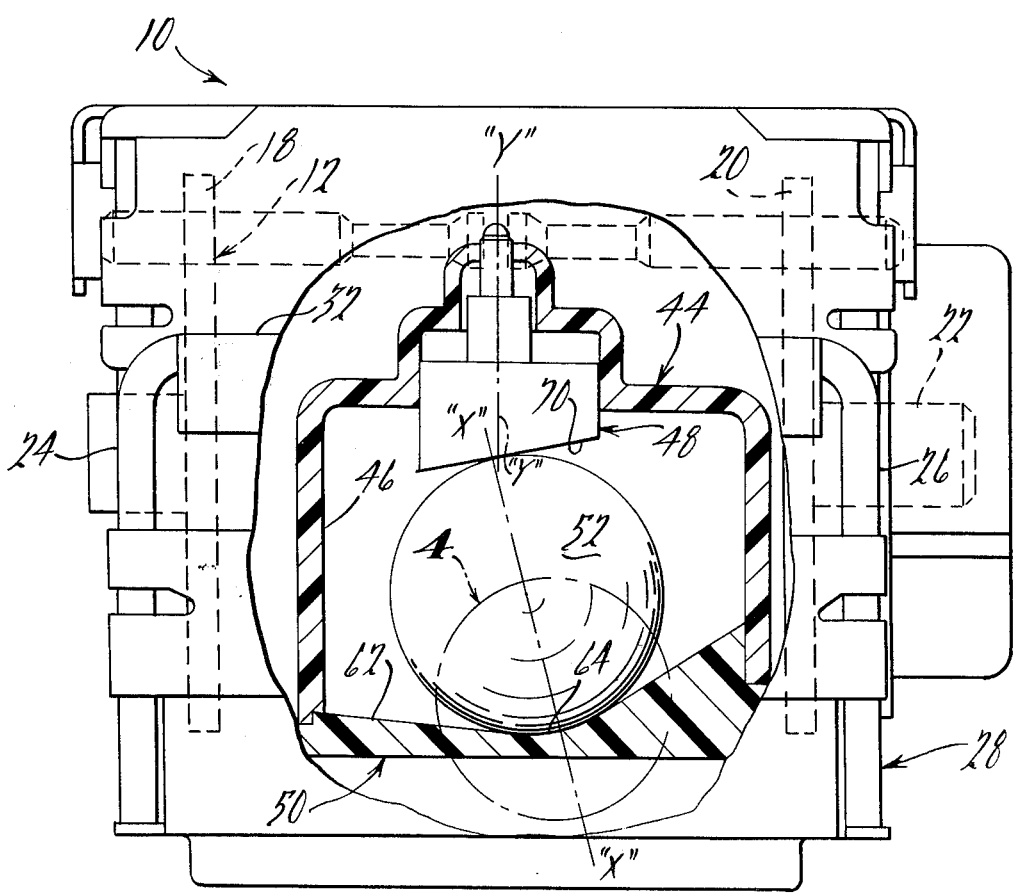

INERTIA LOCKING SEAT BELT RETRACTOR

This is a division, of application Ser. No. 385,315, filed Aug. 3, 1973, now U.S. Pat. No. 4,014,480.

BACKGROUND OF THE INVENTION

Inertia locking retractors, of the type disclosed in the U.S. Pat. No. 3,237,729, and applicant's pending application, Ser. No. 303,550 filed Nov. 3, 1972, now abandoned, effect locking of a belt spool upon the occurrence of an inertia force on the vehicle over and above a predetermined minimum. However, such heretofore known and used retractors are unsatisfactory in certain respects, namely, the initial response characteristic of the inertia member is inconsistent, the retractors are relatively noisy due to movement of the inertia response member relative on its conical seat, and the axis of rotation of the belt spool and retractor frame must be orientated in a horizontal plane requiring, in some instances, additional space in a vehicle.

SUMMARY OF THE INVENTION

The invention resides in an improved seat for a spherical type inertia responsive member. The seat is spherical in part and conical in part. The axis of generation of the seat is angularly related to a horizontal inertia response plane to accommodate installation specifications. Movement of the inertia member due to an inertia force in any direction parallel to the inertia response plane effects latching movement of the pawl thereby locking the belt against further extension.

BRIEF DESCRIPTION OF THE DRAWINGS

FIG. 3 is a view taken in the direction of the arrow 3 of FIG. 2.

FIG. 4 is an enlarged view of the structure within the circle 4 of FIG. 3.

FIG. 5 is an enlarged view of the structure within the circle 5 of FIG. 2.

DETAILED DESCRIPTION OF THE PREFERRED EMBODIMENT

Figure 1:
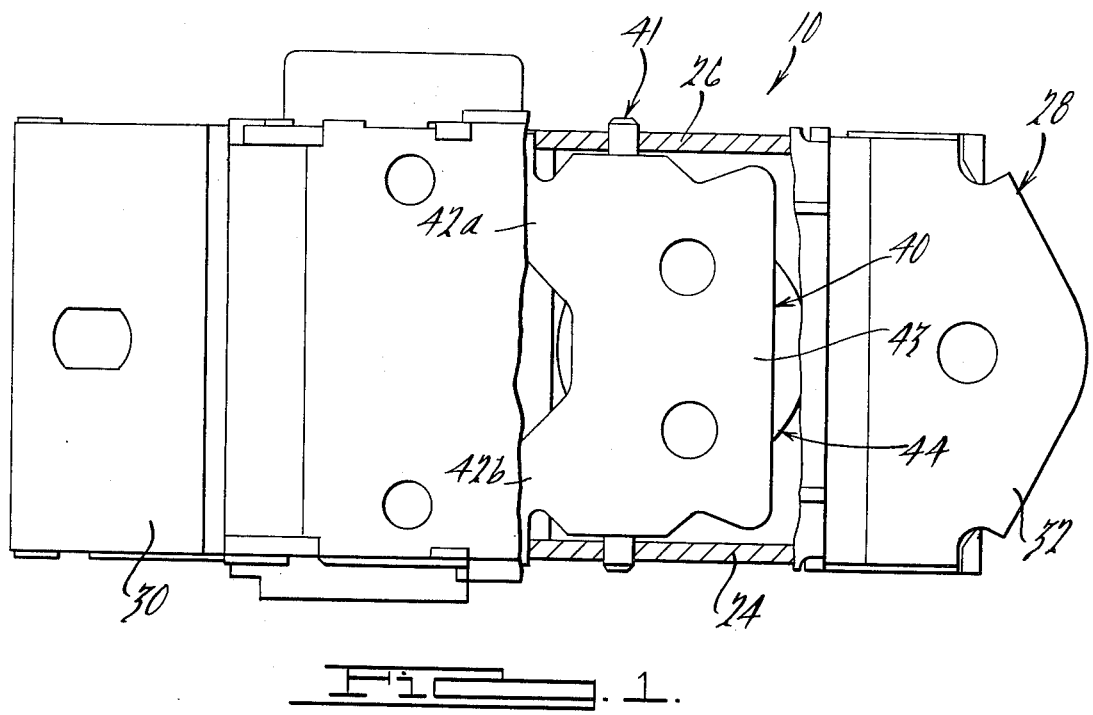
FIG. 1 is a top view of a preferred embodiment of the inertia locking seat belt retractor of the present invention partially broken away for clarity; p

Referring now to the drawings, an inertia locking seat belt retractor assembly 10 has a conventional fabric type seat belt (not shown) wound on a spool 12. The belt is extendable so that a tongue (not shown) thereon can be detachably secured to a belt buckle, (not shown). When the belt is not in use, an internal coil spring (not shown) acts against the belt support spool 12 to retract the belt and tongue in the conventional manner.

As best seen in FIG. 3, the spool 12 comprises a pair of toothed spool flanges 18 and 20 which are secured together by a cylindrical shaft 22 which is fixed thereto as by a press fit. The shaft 22 is suitably supported in a pair of side flanges 24 and 26 of a rigid frame member 28. The side flanges 24 and 26 are maintained in spaced parallel relation by intermediate sections 30 and 32 which are orientated substantially perpendicular thereto. The frame member 28 may be secured to the roof or other structural member of a vehicle by any suitable means.

A pawl 40 is supported for rotation about an axis parallel to the shaft 22 by a pin 41 and has a pair of locking teeth 42 engagable with the teeth on the spool flanges 18 and 20, respectively, to lock the spool 12 against rotation. The pawl 40 is provided with a tab 43 adapted to be engaged by an inertia force response assembly 44, as will be described.

The inertia force response assembly 44 comprises a hollow cylindrical housing 46 for the supporting of a plunger 48 and a seat member 50 (FIG. 3). A steel ball 52, for example, 1.000 inches in diameter, is supported on the seat 50 and is engagable with the movable plunger 48.

As best seen in FIG. 3, the center of the ball or inertia member 52 lies in the axis of generation of a conical portion 62 of the seat 50, when said axis is vertically orientated.

In accordance with one feature of the instant invention, the seat 50 has a spherical portion 64 at the apex of the conical portion 62 thereof, the radius of generation "B", for example, 0.640 inches, of which is larger than the radius "A", for example, 0.500 inches, of the inertia member 52, so that the inertia member 52 engages the seat 50 in point contact. This is an important feature in that the spherical inertia members of prior art retractors are seated in true conical seats resulting in circular line contact. Point contact between the spherical inertia member 52 of the instant invention and its seat 50 permits incremental movement of the inertia member 52 relative to the seat 50 due to small inertia forces. Prior art inertia responsive members react only to a predetermined inertia force above a certain level with no provision whatsoever for such incremental movement of the inertia member.

In accordance with another feature of the instant invention, the axis of generation X—X of the conical portion 62 of seat 50 is angularly related to a plane extending at right angles to the axis of rotation of the spool shaft 22. Thus, the retractor 10 can be orientated at an angle to accommodate specific design configurations of a vehicle. In a constructed embodiment of the invention, the axis of generation X—X of the conical portion 62 of the seat 50 is orientated at an angle of 13° relative to a plane extending normally to the shaft 22. However, the plunger 48 is movable along an axis Y—Y which lies in a plane normal to the spool shaft 22. Thus, in order to make the plunger 48 equally responsive to movement of the inertia member 52 in any direction normal to the axis X—X, a bottom surface 70 of the plunger 48 is generated about an axis extending parallel to X—X axis. In this manner, the retractor 10 can be mounted at a 13° angle relative to a horizontal plane to accommodate the design of a vehicle, yet the inertia responsive member 52 is equally sensitive to inertia forces in any direction in the horizontal plane since the X—X is orientated vertically. Angular orientation of the lower face 70 of the plunger 48 relative to the axis of movement thereof permits the plunger 48 to move at right angles to the axis of rotation of the pawl 40 and spool 12. This orientation of structural components has proved to be the most satisfactory geometry in terms of positive latching of the pawl 40 with the spool 12 upon the occurrence of inertia forces on a vehicle of a magnitude sufficient to require locking of the retractor 10.

Yet another advantage of the spherical portion 64 on the seat 50 is that the inertia member 52 does not return to a positive rest position in the seat 50 with a clatter when a vehicle is on a rough road. In practice, the seat belt retractor 10 is mounted in, for example, the headliner of a motor vehicle. The retractor 10 is mounted so as to orientate the X—X axis about which the conical seat 62 is generated in a vertical condition when the vehicle is parked on a level surface. During normal operation or upon the occurrence of inertia forces less than a predetermined minimum, the belt spool 12 is free to rotate in one direction under the bias of a belt (not shown) and in the other direction under the bias of a spring (not shown).

Upon the occurrence of an inertia force greater than said predetermined minimum, the ball or inertia member 52 moves off the spherical portion 64 of the seat 50 and up the conical portion 62 thereof. Lateral movement of the ball 52 affects movement of the plunger 48 along the axis Y—Y, and upper end portion of the plunger 48 engaging the tab portion 43 of the pawl 40 so as to bias the teeth 42 thereof into engagement with the ratchet teeth on the flanges 18 and 20 of the spool 12 thereby locking the spool 12 against rotation and precluding protraction of a belt (not shown). The novel spherical portion 64 of the seat 50 renders the ball 52 extremely sensitive to inertia forces since the ball 52 is seated on the seat 50 in point contact. Moreover, the absence of a positive seat for the ball 52 eliminates clatter heretofore experienced in inertia responsive seat belt retractors of the type herein disclosed. Moreover, the provision of a bottom face 70 on the plunger 48 which is generated about an axis angularly related to the axis of movement of the plunger 48, in conjunction with the angularly related axis of generation of the conical portion 62 of the seat 50, permits retractor 10 to be angularly mounted within a motor vehicle relative to the horizontal.

Figure 2:
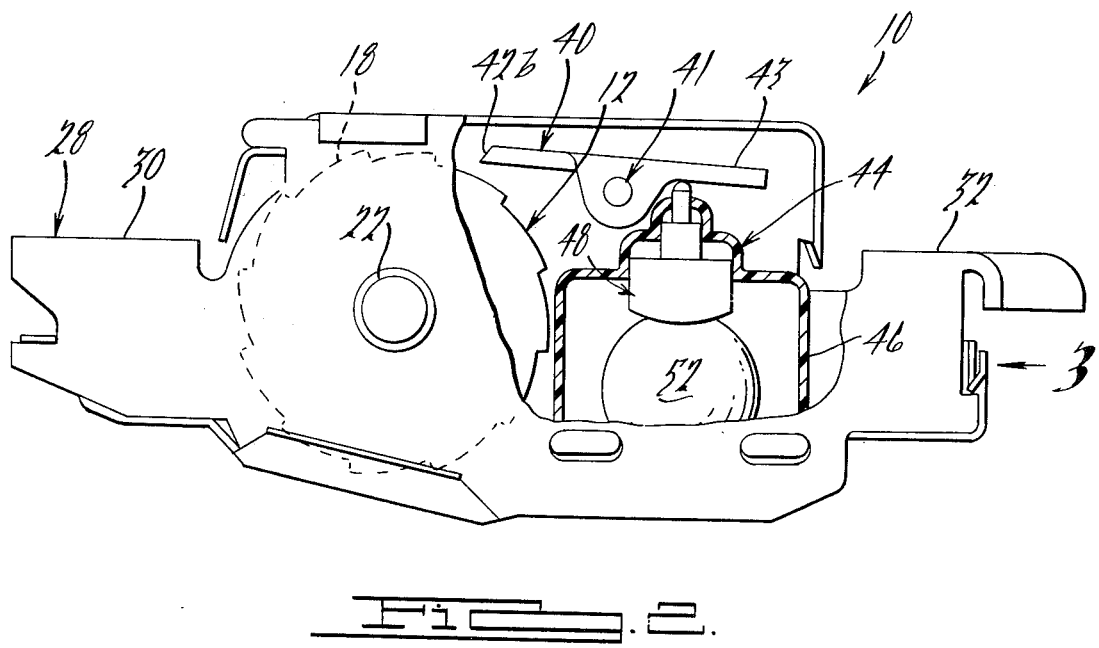
FIG. 2 is a side elevational view of the retractor of FIG. 1, partially broken away for clarity.

In accordance with yet another feature of the instant invention, as best seen in FIG. 5 of the drawings, the teeth 42A and 42B on the pawl 40 are offset with respect to one another relative to the axis of rotation of the pawl 40 about the pin 41. The offset relationship of the teeth 42A and 42B precludes "bounce" of the pawl 40 upon engagement thereof with the teeth of the spool 12 which was heretofore experienced in retractors known to the art wherein the teeth are aligned. The tooth 42A of the pawl 40 is, in accordance, with the instant invention, driven into engagement with the teeth of the spool 12 prior to engagement of the tooth 42B. Engagement of the tooth 42A draws the pawl 40 downwardly, as seen in FIG. 2 of the drawings, thereby drawing tooth 42B into an engaged position. Because the tooth 42B is spaced rearwardly and upwardly from the tooth 42A, it cannot "ride over" the teeth on the spool flange 18 thus insuring that both teeth 42A and 42B will be engaged with the spool flanges 20 and 18, respectively, so far as to maximize the holding power of the pawl 40.

I claim:

1. In a mechanism for locking a safety belt retractor comprising a frame, a belt spool having a pair of spaced flanges with ratchet teeth on the periphery thereof, respectively, mounted for rotation on said frame, a single unitary pawl supported for rotation on and relative to said frame about an axis spaced from and parallel to the axis of rotation of said spool between a locked and unlocked position with respect to said spool, and means for moving said pawl into locking engagement with said spool, the improvement comprising a pair of teeth on said pawl disposed in fixed relation to each other and engageable with the ratchet teeth on said spool flanges, respectively, the spacing between one of the teeth on said pawl and the teeth on the flange on said spool with which it cooperates being less than the spacing between the other tooth on said pawl and the teeth on spool with which it cooperates whereby said one tooth engages its respective ratchet teeth on said spool prior to engagement of the other tooth with its ratchet teeth.

2. In a mechanism for locking a safety belt retractor comprising a frame, a belt spool having a pair of spaced flanges with axially aligned ratchet teeth on the periphery thereof, respectively, mounted for rotation on said frame, a single unitary pawl supported for rotation on and relative to said frame about an axis spaced from and parallel to the axis of rotation of said spool between a locked and unlocked position with respect to said spool, and means for moving said pawl into locking engagement with said spool, the improvement comprising a pair of teeth on said pawl mounted in fixed relation to each other and engageable with the ratchet teeth on said spool flanges, respectively, one of said teeth extending farther from the axis of rotation of said pawl than the other of said teeth whereby said one tooth engages its respective ratchet teeth on said spool prior to engagement of the other tooth with its ratchet teeth.

3. A locking mechanism as set forth in claim 2 wherein the other of said teeth is angularly displaced from said one tooth in a direction away from the ratchet teeth on said spool.

* * * * *